United States Patent
Brogårdh et al.

(10) Patent No.: US 6,218,801 B1
(45) Date of Patent: Apr. 17, 2001

(54) METHOD FOR SUPERVISION OF THE MOVEMENT CONTROL OF A MANIPULATOR

(75) Inventors: Torgny Brogårdh; Staffan Elfving; Ingvar Jonsson; Stig Moberg; Fredrik Skantze, all of Västerås (SE)

(73) Assignee: ABB AB, Vasteras (SE)

(*) Notice: Subject to any disclaimer, the term of this patent is extended or adjusted under 35 U.S.C. 154(b) by 0 days.

(21) Appl. No.: 09/403,612
(22) PCT Filed: May 13, 1998
(86) PCT No.: PCT/SE98/00877
§ 371 Date: Mar. 7, 2000
§ 102(e) Date: Mar. 7, 2000
(87) PCT Pub. No.: WO98/51453
PCT Pub. Date: Nov. 19, 1998

(30) Foreign Application Priority Data

May 15, 1997 (SE) .................................... 9701796

(51) Int. Cl.[7] .................................................. G05B 23/02
(52) U.S. Cl. ...................... 318/567; 318/565; 318/568.22
(58) Field of Search .................................. 318/560–696; 901/3, 5, 45, 15, 18, 23, 27, 28; 706/45, 46, 47; 364/149, 148.01; 395/706, 709

(56) References Cited

U.S. PATENT DOCUMENTS

| 4,305,028 | * | 12/1981 | Kostas et al. ........................ 318/565 |
| 4,603,284 | * | 7/1986 | Perzley ................................ 318/568 |
| 4,912,753 | * | 3/1990 | Evans, Jr. ............................ 364/513 |
| 4,925,312 | | 5/1990 | Onaga et al. . |
| 5,049,796 | | 9/1991 | Seraji . |
| 5,581,166 | * | 12/1996 | Eismann et al. ................. 318/568.22 |
| 5,691,615 | | 11/1997 | Kato et al. . |
| 5,959,861 | * | 9/1999 | Kaneko .............................. 364/149 |
| 6,085,183 | * | 7/2000 | Horn et al. .......................... 706/45 |

FOREIGN PATENT DOCUMENTS

| 0 128 355 | 12/1984 | (EP) . |
| 0 262 600 | 4/1988 | (EP) . |
| 0 604 666 | 7/1994 | (EP) . |
| 80-52675 | 2/1996 | (JP) . |

OTHER PUBLICATIONS

Visinsky, M. L., et al., "New Dynamic Model–Based Fault Detection Thresholds For Robot Manipulators", IEEE International Conference on Robotics and Automation, May 1994, San Diego, California, vol. 2, pp. 1888–1895.

* cited by examiner

Primary Examiner—Paul Ip
(74) Attorney, Agent, or Firm—Connolly Bove Lodge & Hutz, LLP

(57) ABSTRACT

A method for supervision of the movement control of a manipulator. The manipulator comprises at least one movement axis, a servo (9) for controlling the axis in accordance with supplied reference values for position, speed and acceleration ($\psi_{ref}$, $\dot{\psi}_{ref}$, $\ddot{\psi}_{ref}$). A plurality of dynamic parameters (dyn-par) are calculated in dependence on reference values for the position and speed of the axis and a dynamic model (7) which describes the static and dynamic properties of the robot. A torque signal ($\tau_{mr}$) is generated by the servo in dependence on the control error torque ($\tau_{err}$) of the servo. An alarm value (LV) is calculated as a function of the current acceleration ($\ddot{\psi}_m$), at least any of the dynamic parameters and one or more of the following signals: the control error torque ($\tau_{err}$) of the servo, the reference value for the acceleration ($\ddot{\psi}_{ref}$) and the torque signal from the servo ($\tau_{mr}$), and while using one or more signal filters. An alarm limit (LG) is calculated as a function of one or more of the following parameters: a constant, the current position ($\psi_m$), the current speed ($\dot{\psi}_m$), the current acceleration ($\ddot{\psi}_m$) any of the dynamic parameters, the control error torque ($\tau_{err}$) of the servo, the reference value for the acceleration ($\ddot{\psi}_{ref}$) and the torque signal from the servo ($\tau_{mr}$). The alarm value is compared with the alarm limit and an alarm signal (ALARM) is generated in dependence on the comparison.

15 Claims, 7 Drawing Sheets

METHOD FOR SUPERVISION OF THE MOVEMENT CONTROL OF A MANIPULATOR

TECHNICAL FIELD

The invention relates to a method for supervision of the movement control of a manipulator. The manipulator comprises a movable part which may be transferred relative to a stationary part or another movable part, at least one movement axis for positioning of the movable part, at least one motor which drives the axis and hence the movable part, a servo for control of the axis in accordance with reference values supplied, and a position sensor adapted to produce an output signal which defines the current position of the axis.

BACKGROUND ART

By manipulator is meant an industrial robot or external axes connected to the industrial robot, for example for orientation and movement of a work object or for movement of the robot itself. A manipulator comprises one or more arms which are movable in relation to one another, and a handling member which is provided with an attachment and which is movable relative to the arm which supports it. The handling member may, for example, be a single platform or a robot hand which is movable in one or more degrees of freedom. The manipulator is provided with a control system which controls the position and orientation of the handling member. For each one of the movement axes of the manipulator, servo equipment with a drive motor is provided. The servo system of each axis is supplied with a reference value for the angle of rotation of the axis and the drive motor of the axis brings the manipulator to move in the axis in question until the axis position corresponds to the reference value supplied to the servo system. By an axis are meant axis transmissions which may give rise to both rotation and translation of the movable arms and the handling member of the manipulator.

When using industrial robots with associated external axes, it is of great important to supervise the movement control such that no unwanted movements are imparted to any axes in the system or that no axes are subjected to abnormal disturbance torques. A plurality of different faults may arise and, independently of what fault has arisen, the fault must be detected rapidly and safely and the movement control must give the robot and external axes such movements that the consequences of the fault are minimized. The faults may arise in robots, external axes or in the process equipment which is used in the robot installation. Examples of components which may give sudden fault situations are cables, drive devices, motors, sensors, measurement electronics and control electronics.

Faults may also arise in the process which is coordinated with the movement of the robot, for example a spot welding gun or a gripper may get stuck in the wrong position. In addition, faults may arise because the operator makes a mistake, for example jogs the robot against an obstacle, starts an external axis too late, or forgets to set an i/o output which is to control a door through which the robot is to pass. Unless these fault situations are detected and acted on quickly, there is a considerable risk of injury to persons and damage to equipment. The robot and/or external axes may cause heavy collisions or equipment which has become stuck may be torn up. These fault situations may give rise to incorrect position, incorrect speed, incorrect acceleration or incorrect torque of one or more of the axes included in the system.

For supervision of the movement of the robot, there are currently normally used existing signals of the servo, and a fault situation is defined by any of these signals having passed an alarm limit. To avoid a false alarm, filtering of the signals is sometimes required, and in addition to the fact that the signals pass an alarm limit, it may also be required that the signal is above/below the alarm limit for a predetermined period of time. There are also solutions whereby the alarm limit depends on some signal of the servo, for example the measured axis speed. As filters there are normally used low-pass filters to avoid a false alarm because of brief "harmless" signal transients. A special type of filters which also occurs are so-called observer filters. U.S. Pat. No. 5,304,906, for example, describes an observer filter which is used for obtaining a signal which is to be used for supervising disturbance torques on the axis coupled to the servo. Disturbance torques are torques which normally do not influence the axes of the robot and may, for example, be generated by too high a tool load, tools which get stuck, or by collisions. These disturbance torques are normally nor measurable but must be reconstructed to be able to be detected. An observer is actually a feedback filter, which is constructed in the time plane with the aid of a dynamic model of the system in which the filter is to be used. This type of filter is especially interesting for dynamically reconstructing non-measurable signals. In the case of supervision, a reconstructed signal may be used as the signal to be supervised.

One disadvantage of observer filters, however, is that they do not become optimal for a general supervision purpose and that they only fulfil a function when a signal, which may be reconstructed, is to be supervised. Thus, an observer may be designed for supervision of unjustified disturbance torques on the axis, but it cannot be directly designed to detect, for example, an incorrect position, incorrect speed, and incorrect acceleration. It cannot, for example, with sufficient selectivity detect whether an unexpectedly high or low velocity is imparted to an axis, as is the case with a runaway situation. In addition, an observer is relatively slow and is difficult to get stable since mechanical resonances disturb the control, which is the case with elastic robots. By an elastic robot is meant a robot with a low natural frequency. An additional problem is to compensate for the dynamic influence of the mechanics on interference signals and control signals.

SUMMARY OF THE INVENTION

The object of the invention is to achieve a method for supervision of the movement control of a manipulator by means of which incorrect position, incorrect speed, incorrect acceleration, incorrect load, incorrect axis torque and incorrect disturbance torques may be detected.

What characterizes a method according to the invention will become clear from the appended claims.

The method has the following advantages:

a very high sensitivity, a very fast detection, little probability of false alarms, detects all fault situations which may arise, may also be used in elastic axes, that is, axes which are resilient.

The above-mentioned advantages are achieved by forming an alarm condition which comprises an alarm value and an alarm limit. Based on the model, the alarm value takes into consideration both stiff-body properties and elasticity properties of the manipulator. The influence of the elasticities on how normally situations and faults dynamically influence the controlled manipulator axes is modelled in the alarm condition with signal filters, which have essentially the same transfer functions as critical transfer functions between various quantities, for example torque and axis movement, in the manipulator. To obtain an optimum alarm condition, this is derived in accordance with known stiff-body models and elasticity models for the manipulator, starting from a signal combination which gives an output signal directly dependent on the type of fault to be supervised.

The alarm condition has the property of being very sensitive to incorrect disturbance torques, loads, accelerations, etc., while at the same time it is not released for normal operating cases. This is due to the fact that the alarm condition is based on signal combinations which directly describe the faults which are to be detected and that the alarm condition is model-based both with respect to a dynamic stiff-body model and a dynamic elasticity model of the manipulator.

In one embodiment of the invention, the alarm limit may consist of a constant. In a preferred embodiment of the invention, a model-based alarm limit is used instead, which, with knowledge of the modelling errors, gives a minimum alarm level at all types of movements. The alarm limit is based on a model of the errors of the dynamic models and will be automatically increased when, for example, acceleration and speed increase.

DESCRIPTION OF THE PREFERRED EMBODIMENTS

Figure 1:
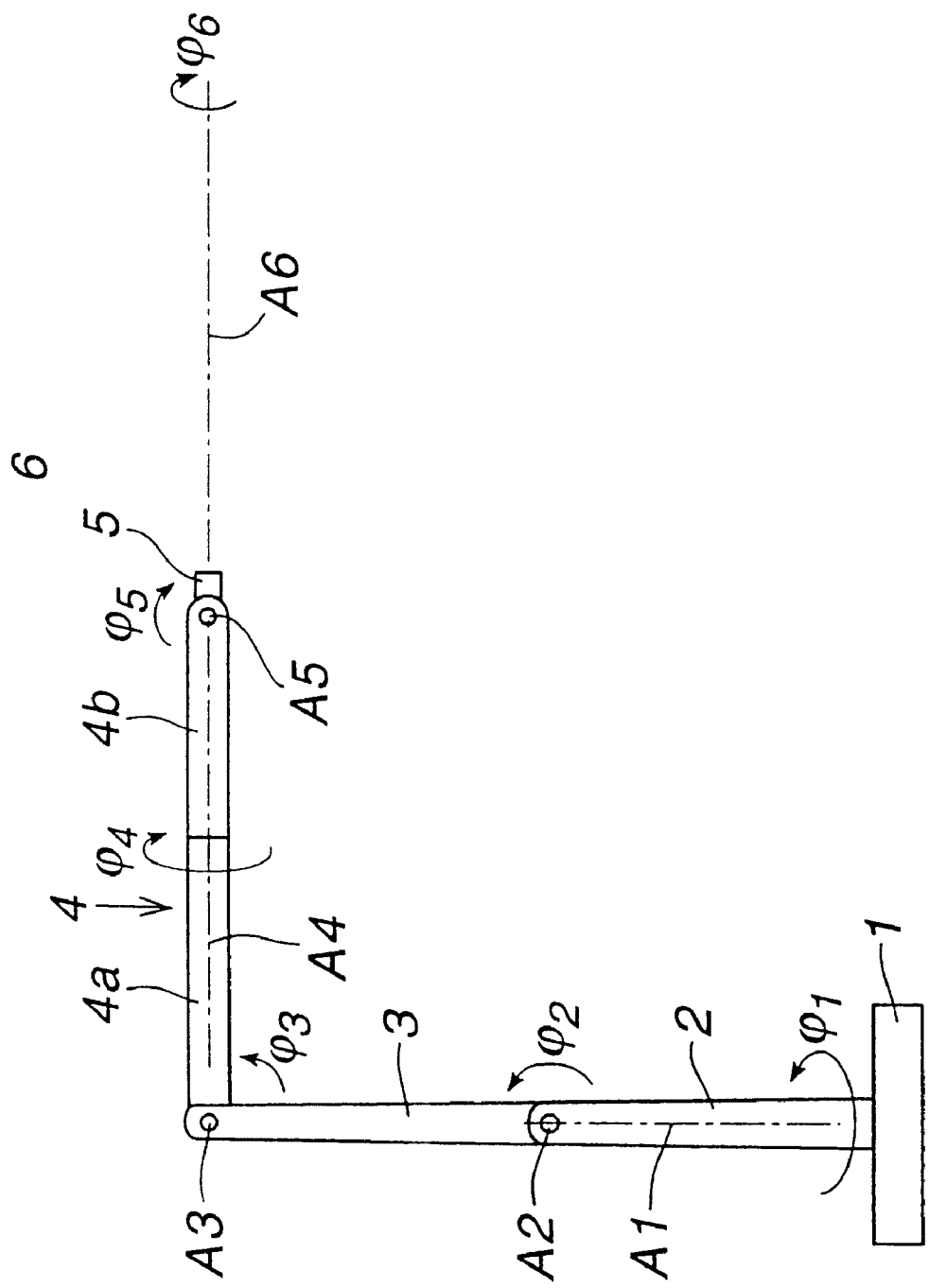
FIG. 1 schematically shows an industrial robot.
Figure 2:
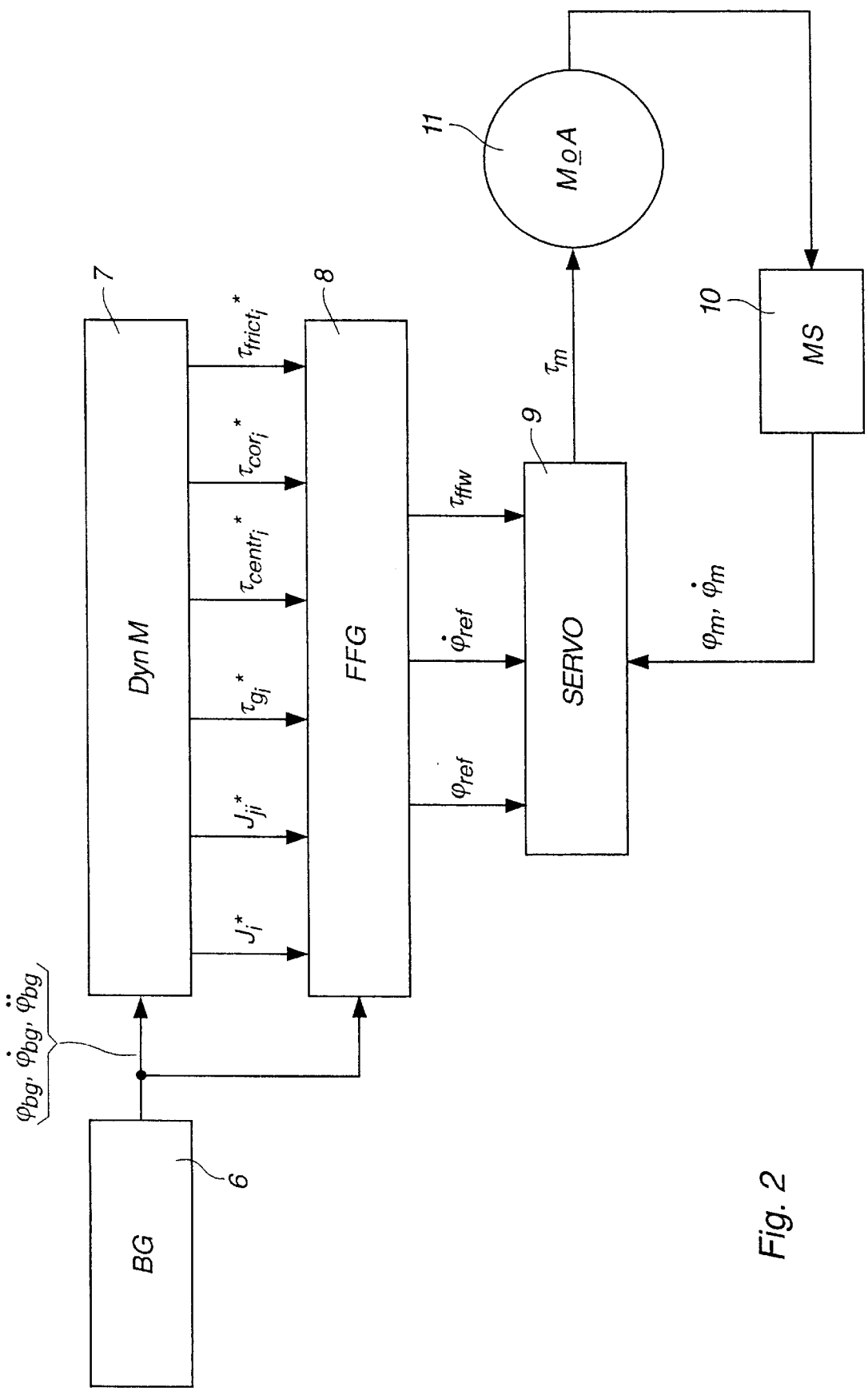
FIG. 2 shows a feedforward servo.

FIGS. 1 and 2 schematically show an industrial robot. The foot 1 of the robot is fixedly mounted on a base. The robot has a base stand 2, which is rotatable in relation to the foot 1 around a vertical axis A1. In the upper end of the base stand, a first robot arm 3 is journalled and rotatable in relation to the base stand around a second axis A2. In the outer end of the arm, a second arm 4 is journalled and rotatable in relation to the first arm around an axis A3. The robot arm 4 comprises two parts 4a and 4b, the outer part 4b being rotatable in relation to the inner part 4a around an axis of rotation A4 coinciding with the longitudinal axis of the arm. The second arm 4 supports, at its outer end, a so-called robot hand 5, which is rotatable around an axis of rotation A5 which is perpendicular to the longitudinal axis of the arm. The outer part of the robot hand is rotatable in relation to its inner part around an axis of rotation A6. Each axis is driven by a motor.

A method according to the invention is based on the following technical solutions:

Using a signal combination for forming a model-based alarm value and a model-based alarm limit.

Generating an alarm signal in dependence on a comparison between the alarm value and the alarm limit.

Using both a stiff-body model and a model which describes the dynamics with respect to the elasticities of the robot when producing the expressions for the alarm limit and the alarm value.

A possibility of supplementing the method with so-called Learning Control.

A possibility of using torque feedforward in the servo.

Using torque feedforward in the servo implies that modelled axis torques are fed forward according to FIG. 2. A trajectory generator 6 calculates reference values for the position $\psi_{bg}$ of the axis, speed $\dot{\psi}_{bg}$ and acceleration $\ddot{\psi}_{bg}$. A dynamic model 7 which describes the static and dynamic properties of the robot calculates dynamic parameters. On the basis of the reference values of the trajectory generator for position, speed and acceleration, the dynamic model calculates the dynamic parameters which are required for the feedforward control. The dynamic parameters are mass inertia $J^*_{ji}$, coupled mass inertia $J^*_{ji}$, moment of gravitational force $\tau^*_{gi}$, torques caused by centrifugal forces during movements $\tau^*_{centri}$ of other axes, torques caused by Coriolis forces in cooperation with the movements $\tau^*_{cori}$ of other axes, and torques caused by static and dynamic friction $\tau^*_{fricti}$.

A feedforward generator 8 calculates reference values for position and speed $\psi_{ref}$, $\dot{\psi}_{ref}$ and a feedforward torque $\tau_{ffw}$ to the servo 9, which controls the motor and the transmission and the shaft 11 mounted on the motor. The feedforward torque $\tau_{ffw}$ is calculated on the basis of the dynamic parameters and the reference values for the position of the axis. From the servo, the motor and hence the axis are controlled in accordance with the reference values. A position sensor with an associated measurement system 10 produces an output signal which defines the current position $\psi_m$ and speed $\dot{\psi}_m$ of the motor shaft, which are supplied to the servo.

To derive an alarm value, an optimal model-based signal combination is set up. How this is done is shown below for a simple model of the motor and the axis according to FIG. 3. In this model, the rotor of the motor consists of a smaller cylinder 12 and the manipulator arm of a larger cylinder 13. The rotor has the mass inertia $J_m$ and the arm has the mass inertia $J_a$. On the rotor, a disturbance torque $\tau_{distm}$ acts, and on the arm a disturbance torque $\tau_{dista}$ acts. Between the rotor and the arm there is an elastic shaft 14 with the spring constant k and the damping c. When the elasticity is tensioned, the axis angle $\psi_m$ of the rotor will differ from the axis angle $\psi_a$ of the arm. The axis angle of the rotor is measured with an angle-measuring device and is supplied to the servo 9 together with the axis speed $\dot{\psi}_m$ of the motor. In the servo 9, $G_{pos}(s)$ is a transfer function for the position controller, $G_{vel}(s)$ is a transfer function for the speed controller, $\tau_{err}$ is the control torque which depends on the control errors in the speed controllers ($\dot{\psi}_{ref}-\dot{\psi}_m$) and in the position controllers ($\psi_{ref}-\psi_m$), $\tau_{mr}$ is the total motor reference torque and is the sum of $\tau_{err}$ and the feedforward torque $\tau_{ffw}$.

$\tau_{mr}=\tau_{err}+\tau_{ffw}$ $\tau_m=k_T\tau_{mr}$ $k_T$ is the torque constant of the drive and the motor.

Derivation of an alarm condition is exemplified by means of the case of runaway. Runaway implies that a movement is imparted to the axis, a movement which has no correspondence in the signals produced to the servo from the feed-forward generator. To obtain maximum sensitivity and minimum response time, the acceleration of the axis is used as a base for obtaining the alarm condition. It is of the greatest importance to find a signal combination which is as insensitive as possible to normal movements, which may be done by means of knowledge of the dynamics of the motor and the axis.

Figure 3:
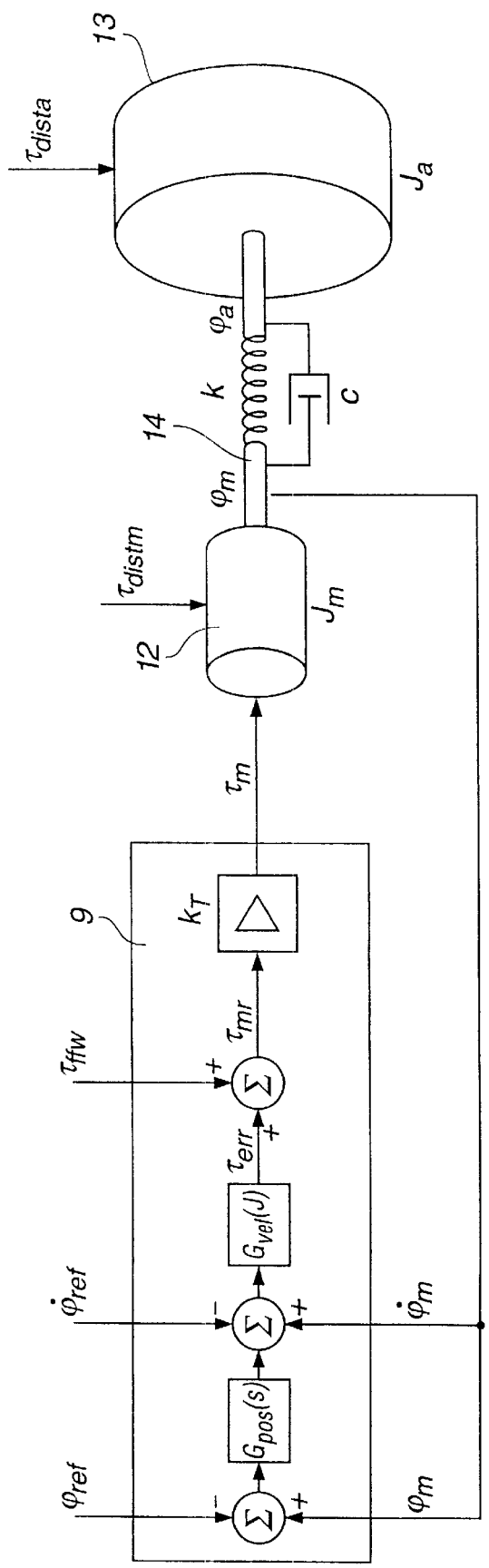
FIG. 3 shows a simple model of a motor and an axis with a simple elasticity.

Starting from FIG. 3, the following expressions may be set up for the acceleration of the motor:

$$\psi_m(s) = G_1(s) \cdot [\tau_m(s) + \tau_{distm}(s)] + G_2(s) \cdot \tau_{dista}(s) \quad (1)$$

where s is the Laplace operator in the frequency plane
  $\psi_m$: the acceleration of the motor
  $\tau_m$: torque generated by the motor to the motor axis
  $\tau_{distm}$: torque disturbance on the motor axis
  $\tau_{dista}$: torque disturbance on the arm
  $G_1(s)$: the transfer function between supplied torque on the motor axis and the acceleration of the motor axis
  $G_2(s)$: the transfer function between supplied torque on the arm side and the acceleration of the motor axis.
  $G_1(s)$ and $G_2(s)$ include the following parameters:
  $J_m$: mass inertia of the motor
  $J_a$: mass inertia of the arm
  K: spring constant between motor and arm
  c: damping between motor and arm.

Normally, a gearbox with a defined gear ratio is used between the motor side and the arm side. All the parameters and signals are, however, converted to the motor side, which, for example, implies that torques have been reduced by the factor 1/n, where n is the gear ratio, and mass inertias by the factor $1/n^2$.

Figure 4:
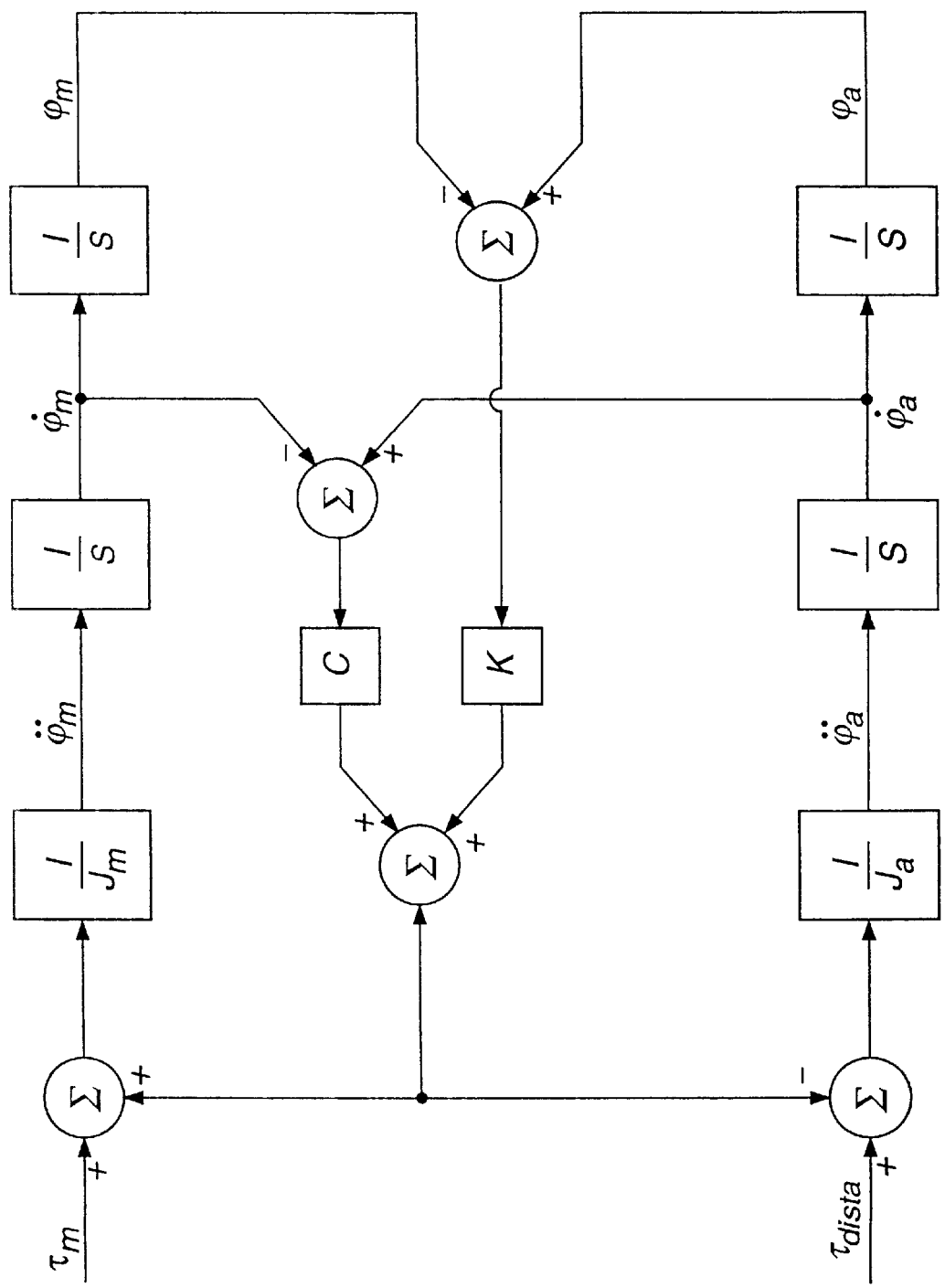
FIG. 4 shows a dynamic model of the motor and the axis with a simple elasticity.

FIG. 4 shows a dynamic model for the motor and arm mechanics according to FIG. 3. With the aid of this model, the transfer functions $G_1(s)$ and $G_2(s)$ may be derived:

$$\ddot{\varphi}_m = \frac{\tau_m}{J_m} + \frac{c}{J_m \cdot s}(\dot{\varphi}_a - \dot{\varphi}_m) + \frac{k}{J_m \cdot s^2}(\dot{\varphi}_a - \dot{\varphi}_m) \quad (2)$$

where $$\ddot{\varphi}_a = \frac{c \cdot s + k}{J_a \cdot s^2 + c \cdot s + k} \cdot \ddot{\varphi}_m \quad (3)$$

This gives $$G_1(s) = \frac{J_a \cdot s^2 + c \cdot s + k}{J_m \cdot J_a \cdot s^2 + (J_m + J_a) \cdot c \cdot s + (J_m + J_a) \cdot k} \quad (4)$$

$$G_2(s) = \frac{c \cdot s + k}{J_m \cdot J_a \cdot s^2 + (J_m + J_a) \cdot c \cdot s + (J_m + J_a) \cdot k} \quad (5)$$

In the relationship 1 it now remains to obtain expressions for $\tau_m$, $\tau_{distm}$ and $\tau_{dista}$. With feedforward control according to FIG. 2 and FIG. 3, the following expressions are obtained for $\tau_m$:

$$\tau_m = k_T \cdot \left[ \tau_{err} + (J_a^* + J_m^*) \cdot \ddot{\varphi}_{ref} - \right. \quad (6)$$
$$\tau^*_{statfrict} \cdot sign(\dot{\varphi}_{ref}) - f^*_{dynfrict} \cdot (\dot{\varphi}_{ref})^{P^*} - \tau^*_{rippel} - \tau^*_{gravity} -$$
$$\left. \sum_j f^*_{centr_j} (\dot{\varphi}_{ref_j})^2 - \sum_{i,j} f^*_{cor_{ij}} \cdot (\dot{\varphi}_{ref_i}) \cdot (\dot{\varphi}_{ref_j}) - \sum_{j,k} J^*_{jk} \cdot \ddot{\varphi}_{ref_j} \right]$$

Further, the following relationships apply:

$$\tau_{distm} = \tau_{statfrict} \cdot sign(\dot{\psi}_m) + f_{dynfrict} \cdot (\dot{\psi}_m)^P + \tau_{rippel} \quad (7)$$

$$\tau_{dista} = \tau_{gravity} + \sum_j f_{centr_j} \cdot (\dot{\varphi}_j)^2 + \sum_{i,j} f_{cor_{ij}} \cdot \quad (8)$$
$$(\dot{\varphi}_i) \cdot (\dot{\varphi}_j) + \sum_{j,k} J_{jk} \cdot \ddot{\varphi}_j$$

Here, an * means that the dynamic parameter is modelled and hence suffers from a model error. For both modelled and actual dynamic parameters, the following definitions apply:

$k_T$: the torque constant of the motor including drive circuits. The torque constant is the ratio between the actual motor torque and the reference torque.
  $\tau_{err}$: torque reference generated by the speed and position controllers in dependence on control errors.
  $\tau_{statfrict} \cdot sign(\dot{\psi}_m)$: a simple description of the static friction as a torque multiplied by the sign of the speed.
  $f_{dynfrict} \cdot (\dot{\psi}_m)^P$: the dynamic friction, which is proportional to the speed raised to the exponent p.
  $\tau_{rippel}$: torque disturbance caused by rotor and stator ripple in the motor.
  $\tau_{gravity}$: the torque from the gravitational force on the arm.

$$\sum_j f_{centr_j} \cdot (\dot{\varphi}_j)^2:$$

torque on the arm side caused by centrifugal forces from the axes with index j.

$$\sum_{i,j} f_{cor_{ij}} (\dot{\varphi}_i) \cdot (\dot{\varphi}_j):$$

torque on the arm side caused by Coriolis forces from cooperating axis pairs i and j.

$$\sum_{j,k} J_{jk} \cdot \ddot{\varphi}_j:$$

torque on the arm side caused by coupled mass inertia from the axes j.

The friction on the arm side has been omitted since the frictional torques will be divided by the gear ratio when conversion to the motor side takes place. All the relationships are converted to the motor side.

We now have a complete description of all the components included in relationship 1 and we can now form a signal combination $\rho_{rus}$ which may be used for producing an alarm condition.

$$\rho_{rus}(s) = G_{rus}(s) \cdot (\psi^*_m(s) - \psi_m(s)) \quad (9)$$

$G_{rus}(s)$ is a filter which is substantially used for noise reduction of the acceleration signals. $\psi^*_m(s)$ is not known and must be derived to obtain a useful signal combination. Further, the alarm conditions and alarm limits which are to be implemented must be derived. How this is done is exemplified with the case of runaway, whereby the expression for $\rho_{rus}(s)$ can be directly used.

With equation 1 in equation 9, the following is obtained:

$$\rho_{rus}(s) = G_{rus}(s) \cdot (G_1(s) \cdot [\tau_m(s) + \tau_{distm}(s)] + G_2(s) \cdot \tau_{dista}(s) - \psi_m(s)) \quad (10)$$

According to equations 6, 7 and 8:

$$\tau_m = k_T \cdot (J^*_a + J^*_m) \cdot \psi_{ref} - k_T \cdot \tau^*_{distm} - k_T \cdot \tau^*_{dista} + k_T \cdot \tau_{err} \quad (11)$$

Equation 11 in 10 gives:

$$\rho_{rus}(s) = G_{rus}(s) \cdot (G_1(s) \cdot [k_T \cdot (J^*_a + J^*_m) \cdot \psi_{ref}(s) - k_T \cdot \tau^*_{distm}(s) -$$
$$-k_T \cdot \tau^*_{dista}(s) + k_T \cdot \tau^*_{err}(s) + \tau_{distm}(s)] + G_2(s) \cdot \tau_{dista}(s) - \psi_m(s)) \quad (12)$$

Set $J_a = J^*_a$, $J_m = J^*_m$, $c = c^*$, $k = k^*$, $k_T = k^*_T$, $$\tau_{dista} = \tau^*_{dista} + \tau^*_{deva}$$

$$\tau_{distm} = \tau^*_{distm} + \tau^*_{devm}$$

where $\tau^*_{dev}$ is the estimated maximum deviation between actual disturbance torque and modelled disturbance torque. For the case of simple elasticity according to the model in FIG. 4 and with $G_{rus}(s) = 1$, this gives:

$$\rho_{rus}(s) = \frac{J^*_a \cdot s^2 + c^* \cdot s + k^*}{J^*_m \cdot J^*_a \cdot s^2 + (J^*_m + J^*_a) \cdot c^* \cdot s + (J^*_m + J^*_a) \cdot k^*} \cdot \quad (13)$$

$$[k_T \cdot (J^*_a + J^*_m) \cdot \psi_{ref}(s) + (\tau^*_{distm}(s) + \tau^*_{devm}(s) -$$
$$k^*_T \cdot \tau^*_{distm}(s) + k^*_T \cdot \tau_{err}(s)) +$$

$$\frac{c^* \cdot s + k^*}{J^*_m \cdot J^*_a \cdot s^2 + (J^*_m + J^*_a) \cdot c^* \cdot s + (J^*_m + J^*_a) \cdot k^*} \cdot$$

$$(\tau^*_{dista}(s) + \tau^*_{deva}(s)) -$$

$$\frac{J^*_a \cdot s^2 + c^* \cdot s + k^*}{J^*_m \cdot J^*_a \cdot s^2 + (J^*_m + J^*_a) \cdot c^* \cdot s + (J^*_m + J^*_a) \cdot k^*} \cdot$$

$$k^*_T \cdot \tau^*_{dista}(s) - \psi_m(s)]$$

In case of perfect control and in the case of a stiff body, $k \to \infty$ and $\tau_{err}(s) = 0$ and the condition for alarm then becomes the expected one:

$$AMPL(\psi_{ref}(s) - \psi_m(s)) \geq EPS$$

where AMPL ( ) means the amplitude of the frequency spectrum within the frequency range studied and EPS is a small number.

If the control is not perfect, in the stiff-body case the condition will instead be as follows:

$$AMPL\left(\varphi_{ref}(s) - \varphi_m(s) + \frac{1}{J^*_m + J^*_a} \cdot \tau_{err}(s)\right) \geq EPS$$

$\tau_{err}(s)$ depends on model error during normal operation. It may be assumed that $J^*_a$ varies so slowly that it may be regarded as constant in the frequency range of interest for the supervision.

The expression 13 may be transferred to an alarm condition by introducing the following definitions:

$$k^*_T = 1 + k^*_{Tdev}$$

$$G^*_1(s) = \frac{1}{(J^*_m + J^*_a)} \cdot \frac{J^*_a \cdot s^2 + c^* \cdot s + k^*}{\frac{(J^*_m \cdot J^*_a)}{(J^*_m + J^*_a)} \cdot s^2 + c^* \cdot s + k^*} \quad (14)$$

$$= \frac{1}{(J^*_m + J^*_a)} \cdot G^*_3(s)$$

$$G^*_2(s) = \frac{1}{J^*_m + J^*_a} \cdot \frac{c^* \cdot s + k^*}{\frac{J^*_m \cdot J^*_a}{J^*_m + J^*_a} \cdot s^2 + c^* \cdot s + k^*} \quad (15)$$

$$= \frac{1}{J^*_m + J^*_a} \cdot G^*_4(s)$$

$G^*_1(s)$ is a model of the transfer function between supplied torque on the motor side and the acceleration of the motor axis.

$G^*_2(s)$ is a model of the transfer function between supplied torque on the arm side and the acceleration of the motor axis.

The expression 13 may now be modified with the aid of 14 and 15, which gives the following alarm condition when $G_{rus}$ is divided into $G_{rus1}$ and $G_{rus2}$:

$$AMPL\left(G_{rus1} \cdot G^*_3(s) \cdot \varphi_{ref}(s) - \varphi_m(s) + \frac{G^*_3(s)}{J^*_m + J^*_a} \cdot \tau_{err}(s)\right) \geq \quad (16)$$

$$AMPL\left(G_{rus2} \cdot G^*_{3max}(s) \cdot k^*_{Tdev} \cdot \varphi_{ref}(s) + \right.$$

$$\frac{G^*_{3max}(s)}{J^*_m + J^*_a - J^*_{dev}} \cdot (\tau^*_{devm}(s) - k^*_{Tdev} \cdot \tau^*_{distm}(s)) +$$

$$\frac{G^*_{3max}(s)}{J^*_m + J^*_a - J^*_{dev}} \cdot k^*_{Tdev} \cdot \tau_{err}(s) + \frac{G^*_{4max}(s) - G^*_{3max}(s)(1 + k^*_{Tdev})}{J^*_m + J^*_a - J^*_{dev}} \cdot$$

$$\left. \tau^*_{dista}(s) + \frac{G^*_4(s)}{J^*_m + J^*_a - J^*_{dev}} \cdot \tau^*_{deva}(s)\right)_{max}$$

Here the following definitions have been introduced:

$G^*_{3MAX}(s)$ is $G_3(s)$ with maximum deviation of $J^*_m$, $J^*_a$, $c^*$, $k^*$ where this maximum deviation gives a maximum amplitude of $G_3(s)$ in the frequency range in question.

$k^*_{Tdev}$ is the maximum positive deviation from the value 1 of $k^*_T$ $J^*_{dev}$ is the maximum deviation of $J^*_m + J^*_a$ $G^*_{4MAX}(s)$ is defined in the same way as $G^*_{3MAX}(s)$.

$G^*_3$, $G^*_{3max}$, $G^*_4$, $G^*_{4max}$ are model-controlled filters whereas $G_{rus1}$ and $G_{rus2}$ are low-pass filters.

The dynamic model error parameters $\tau^*_{devm}$ and $\tau^*_{deva}$ are formed on the basis of knowledge of the errors of the modelled parameters. From the expressions 6, 7 and 8 the following is obtained:

$$\tau^*_{devm} = d^*_{statfrict} \cdot \tau^*_{statfrict} \cdot \text{sign}(\varphi_{ref}) + \quad (17)$$

$$d^*_{dynfrict} \cdot f^*_{dynfrict} \cdot (\varphi_{ref})^{p^*} +$$

$$d^*_{rippel} \cdot \tau^*_{rippel}$$

-continued $$\tau^*_{deva} = d^*_{gravity} \cdot \tau^*_{gravity} + \sum_j d^*_{centr_j} \cdot f^*_{centr_j} \cdot (\dot{\varphi}_{ref_j})^2 + \quad (18)$$

$$\sum_{i,j} d^*_{cor_{ij}} \cdot f^*_{cor_{ij}} \cdot (\dot{\varphi}_{ref_i})(\dot{\varphi}_{ref_j}) +$$

$$\sum_{j,k} d^*_{J_{jk}} \cdot J^*_{jk} \cdot \ddot{\varphi}_{ref_j}$$

The d *-parameters indicate the maximum error factor of the respective dynamic parameters. If the error is large, d* will be large (but<1) and if the modelled parameter corresponds well to reality, d* will lie near 0.

The model-based alarm limit will automatically be changed with the position, speed and acceleration of the manipulator axes. If, for example, the speed is reduced in all the axes, the error terms from dynamic friction, centrifugal forces and Coriolis forces will decrease and the alarm limit is automatically reduced.

Two filters $G_A$ and $G_B$ are introduced. Now set in accordance with 14 and 15:

$$G^*_1 = \frac{1}{J^*_m + J^*_a} \cdot G^*_3$$

$$G^*_{1max} = \frac{1}{J^*_m + J^*_a - J_{dev}} \cdot G^*_{3max}$$

$$G^*_{2max} = \frac{1}{J^*_m + J^*_a - J_{dev}} \cdot G^*_{4max}$$

$$J^*_{tot} = J^*_m + J^*_a$$

$$J^*_{totmin} = J^*_m + J^*_a - J^*_{dev}$$

$$J^*_{totmax} = J^*_{totmin} + 2J^*_{dev}$$

$$G_A = G_{rus1}$$

$$G_B = G_{rus2}$$

We now obtain the general alarm condition:

$$LV_1 = |G_A \cdot (G^*_1 \cdot (J^*_{tot} \cdot \ddot{\psi}_{ref} + \tau_{err}) - \psi_m)| \geq$$
$$\geq |G_B \cdot (G^*_{1max} \cdot [k^*_{Tdev} \cdot J^*_{tot\,max} \cdot \ddot{\psi}_{ref} + \tau^*_{devm} - k^*_{Tdev} \cdot \tau^*_{distm} -$$
$$-(1+k^*_{Tdev}) \cdot \tau^*_{dista} + k^*_{Tdev} \tau_{err}] + G^*_{max} \cdot [\tau^*_{dista} + \tau^*_{deva}])| = LG_1 \quad (19)$$

$LV_1$: alarm condition
$LG_1$: alarm limit $G_A$ are $G_B$ are filters of low-pass type or of bandpass type and the purpose of using these filters is to reduce the influence of unwanted disturbances of the alarm condition.

Figure 5:
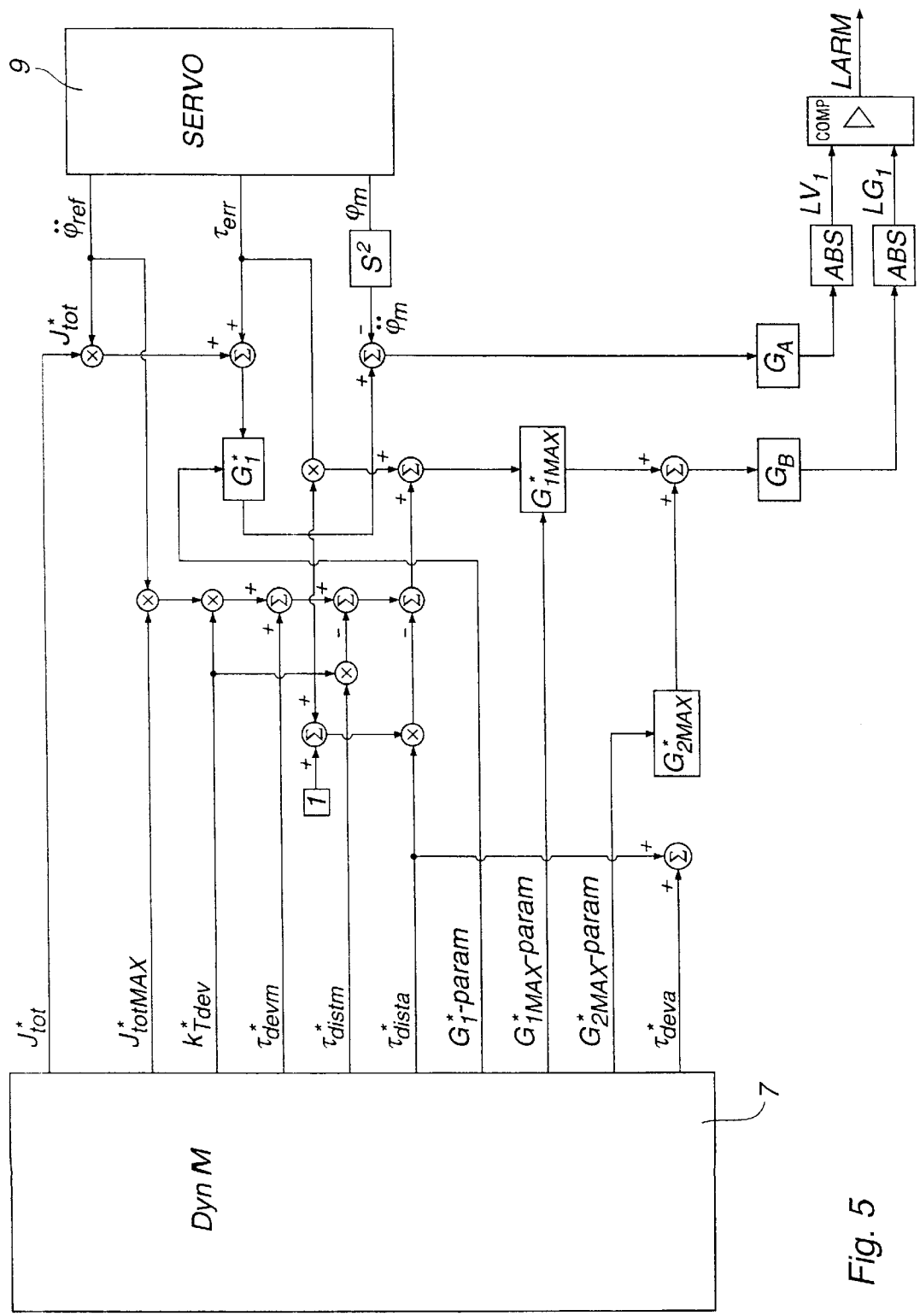
FIG. 5 shows a block diagram for generation of an alarm value and an alarm limit according to a first embodiment.

In the normal case, $LV_1 < LG_1$. If $LV_1 > LG_1$ an alarm is released. FIG. 5 shows a block diagram of a supervision which implements equation 19. The signals which are used for calculating the alarm value LV are $\psi_{ref}$, $\tau_{err}$, $\psi_m$. The alarm limit LG is calculated with the aid of the signals $\psi_{ref}$ and $\tau_{err}$. The following parameters are calculated by the dynamic model: $J^*_{tot}$, $J^*_{totMAX}$, $k^*_{Tdev}$, $\tau^*_{devm}$, $\tau^*_{distm}$, $\tau^*_{dista}$, $\tau^*_{deva}$ and the parameters included in $G^*_1$, $G^*_{1max}$, $G^*_{2max}$.

The alarm limit determines the sensitivity to detection of different error conditions such as incorrect position, incorrect speed (runaway), incorrect acceleration, incorrect load, incorrect axis torque and incorrect disturbance torque (e.g. jamming). The alarm limit $LG_1$ in equation 19 is especially sensitive with respect to detection of runaway, but it may also be used for the other error conditions if an unmodelled alarm limit component is added. In its simplest case, the alarm limit may be constant. The constant alarm limit must have a value which is greater than the maximum alarm value for normal operating situations of the robot.

A certain logic is required to generate the sign of $k^*_{Tdev}$ such that the alarm condition becomes maximized with respect to the sign of $k^*_{Tdev}$. To explain the cases where $\tau_{mr}$ is limited by a torque limit, which gives $\tau_{mr,limit}$, instead of $\tau_{err}$ the difference between $\tau_{mr,limit}$ and $\tau_{ffw}$ is used, that is, $\tau_{mr,limit} - \tau_{ffw}$.

For a stiff manipulator, $k^* \rightarrow \infty$, which gives the following:

$$G^*_1 = \frac{1}{J^*_{tot}} \quad (20)$$

$$G^*_{1max} = \frac{1}{J^*_{totmin}}$$

$$G^*_{2max} = \frac{1}{J_{totmin}}$$

In the derivation of $G^*_1$ and $G^*_2$ a simple motor/arm model, with an elasticity between the motor side and the arm side of the axis, is used. In more complex flexible arm systems with coupled oscillations between different arms which give rise to several oscillation modes, $G^*_1$ och $G^*_2$ will be of a higher order, but the alarm condition 19 will be the same.

An analysis corresponding to the one made for supervision of runaway may also be made for other fault conditions. If, for example, non-modulated disturbance torques are to be supervised, the following signal combinations may be started from:

$$\rho_{dist}(s) = G_{dist}(s) \cdot (\tau^*_{dista}(s) - \tau_{dista}(s)) \quad (21)$$

Now, $\tau_{dista}(s)$ is not directly measurable as $\psi_m(s)$ in the case of runaway, $\psi_m$ is used as a measurement signal. A relationship must therefore be obtained between $\tau_{dista}(s)$ and $\psi_m(s)$.

From equation 1 the following is obtained:

$$\tau_{dista}(s) = G_2^{-1}(s) \cdot \{\psi_m(s) - G_1(s) \cdot [\tau_m(s) + \tau_{distm}(s)]\} \quad (22)$$

The expression for $\tau_m(s)$ is obtained from 11 and may be inserted into 22:

The alarm condition for the flexible case will now be:

$$LV_1 = |G_A \cdot (G^*_1 \cdot (J^*_{tot} \cdot \ddot{\psi}_{ref} + \tau_{err}) - \psi_m)| \geq$$
$$|G_B \cdot (G^*_{1max} \cdot [k^*_{Tdev} \cdot J^*_{tot\,max} \cdot$$
$$\ddot{\psi}_{ref} + \tau^*_{devm} - k^*_{tdev} \cdot \tau_{err}] + \text{Max}\{G^*_{1max} \cdot \tau^*_{deva}, G^*_{2max} \cdot \tau^*_{deva}\})| = LG_2 \quad (23a)$$

The difference between the alarm condition for runaway, equation 19, and the alarm condition for disturbance torque, equation 23a, thus resides in the expression for the model-based alarm limit.

The method may also be used for detecting, during an emergency stop, when the mechanical brakes start working. This gives a possibility of accurate control also during an emergency stop process.

To derive the alarm condition for load errors, it is suitable to find a signal combination for the error in the mass inertia. Since all the movements require at least one acceleration period and one deceleration period, all the movements will therefore be influenced by errors in the mass inertia. Thus, the following signal combination may be made the starting-point:

$$\rho_{load} = (J^*_{tot} - J_{tot})$$

To relate this signal combination to measurable signals, the following approximation is made:

$$\rho_{load} = (J^*_{tot} \cdot \psi_{ref} - J_{tot} \cdot \psi_m)$$

With the aid of the relationships 1 and 11, it may be shown that also in this case, the alarm condition according to 19 is obtained with a few minor modifications of the alarm limit.

The general alarm condition 19 may be revised to obtain forms which are easier to implement. Using relationship 11, the following alarm condition may thus be obtained:

$$LV_2 = |G_A \cdot (G^*_1 \cdot (\tau_{mr} + \tau^*_{distm}) + G^*_2 \cdot \tau^*_{dista} - \psi_m)| \geq \geq |G_B \cdot (G^*_{1max} \cdot (k^*_{Tdev} \cdot \tau_{mr} + \tau^*_{devm}) + G^*_{2max} \tau^*_{deva})| = L(23b)$$

By multiplication by $G_2^{-1*}$ and $G_{2max}^{-1}$ the following alarm condition is obtained:

$$LV_3 = |G_A \cdot (G_2^{-1*} \cdot G^*_1 \cdot (\tau_{mr} + \tau^*_{distm}) + \tau^*_{dista} - G_2^{-1*} \cdot \psi_m)| \geq \geq |G_B \cdot (G_{2max}^{-1} \cdot G^*_{1max} \cdot (k^*_{Tdev} \cdot \tau_{mr} + \tau^*_{devm}) + \tau^*_{deva})| = (23c)$$

Figure 6:
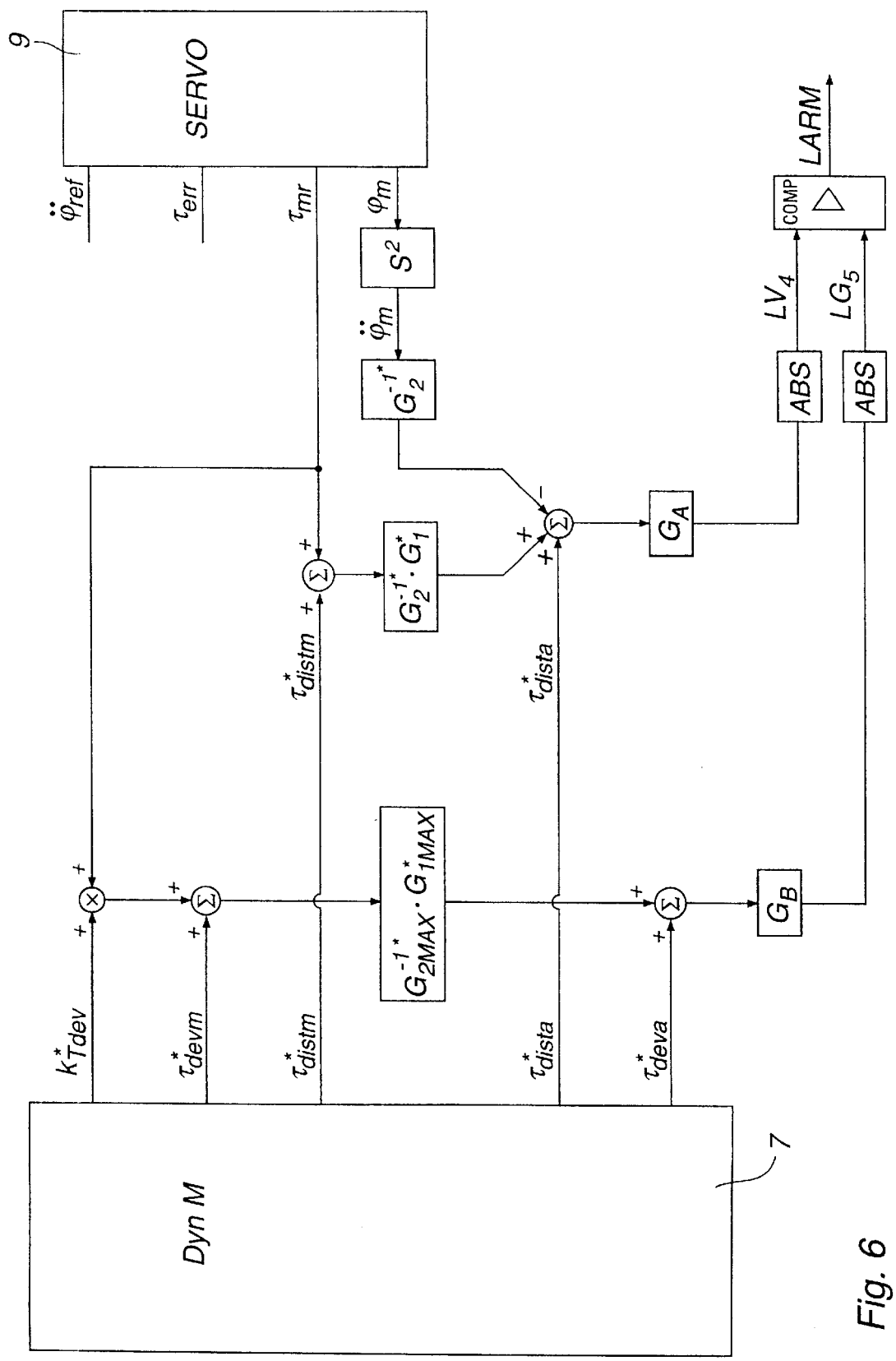
FIG. 6 shows a block diagram for generation of an alarm value and an alarm limit according to an additional embodiment.

FIG. 6 shows a block diagram for generating the alarm condition according to equation 23c. The dynamic model, block 7, calculates the following parameters: $k^*_{dTev}, \tau^*_{devm}, \tau^*_{distm}, \tau^*_{dista}, \tau^*_{deva}$.

For a simple elasticity, the following applies:

$$G_2^{-1*} = G_2^{-1*} \cdot G^*_1 \cdot J^*_m + J^*_a$$

This gives the alarm condition:

$$LV_4 = |G_A \cdot (G_2^{-1*} \cdot G^*_1 \cdot (\tau_{mr} - J^*_m \cdot \psi_m + \tau^*_{distm}) + \tau^*_{dista} - J^*_a \cdot \psi_m)| \geq$$

$$\geq |G_B \cdot (G_{2max}^{-1} \cdot G^*_{1max} \cdot (k^*_{Tdev} \cdot \tau_{mr} - J^*_{devm} \cdot \psi_m + \tau^*_{devm}) + \tau^*_{deva} + J^*_{deva} \cdot \psi_m)| = LG_5 \quad (23d)$$

The alarm conditions 23a–23d have the property of being very sensitive to incorrect disturbance torques, loads, accelerations, etc., while at the same time they do not release during normal operating cases. This is due to the following facts:

The alarm conditions are based on signal combinations which directly describe the faults which are to be detected.

The alarm conditions are model-based both with respect to a dynamic stiff-body model and a dynamic elasticity model of the manipulator.

The alarm limit is based on a model of the error of the dynamic models and will be automatically increased when, for example, the acceleration and the speed increase.

The alarm conditions give very rapid detection and may also be used in very elastic axes in that the effects of the elasticities and the axis damping factors are modelled through filters which implement the transfer functions:

$$G_1(s), G_2(s), G_2^{-1}(s), \text{ och } G_2^{-1}(s) \cdot G_1(s)$$

In addition, the derivation from different signal combinations show that the alarm condition is generally applicable.

If Learning Control is used, the expression 11 will be supplemented:

$$\tau_m = k_T \cdot (J^*_a + J^*_m) \cdot \psi_{ref} - k_T \tau^*_{distm} - k_T \tau^*_{dista} + k_T \tau_{err} + k_T \tau_{LC} \quad (24)$$

where $\tau_{LC}$ is the feedforward torque from the Learning Control loop. $\tau_{LC}$ will reduce $\tau_{err}$ and $\tau_{ffw} + \tau_{LC}$ will provide a torque feedforward with a small error. This enables the alarm limit to be lowered. How much the alarm limit can be lowered depends on how many learning cycles have been run and on how efficient the learning is.

Learning Control means that signals from the servo are stored away during the program execution and that these signals are utilized in a later program execution for improving the performance of the control. Learning Control is described, for example, in an article "Learning Control of Robot Manipulators" by Robert Horowitz in Journal of Dynamic Systems, Measurement and Control, June 1993, Vol. 115 pages 402–411.

Learning Control may also be adapted directly to the alarm condition. In this way, the value of the lefthand term in, for example, (23a) is stored from cycle to cycle and the stored values are used as alarm limits:

$$V_{LC}(k,t) = |G_A \cdot (G^*_1 \cdot (J^*_{tot} \cdot \psi_{ref} + \tau_{eer}) - \psi_m)|_{cycle\ k,\ time\ t}, \Delta V_{LC}(t) = |V_{LC}(k,t) - V_{LC}(k-1,t)|_{one\ or\ more\ k\text{-}values} \quad (25)$$

An alarm is then released by the alarm condition:

$$LV_5 = |G_A \cdot (G^*_1 \cdot (J^*_{tot} \cdot \psi_{ref} + \tau_{eer}) - \psi_m)|_{k+1,t} \geq |V_{LC}(k,t) + \Delta V_{LC}| = LV_{61}$$

or $$LV_5 = |G_A \cdot (G^*_1 \cdot (J^*_{tot} \cdot \psi_{ref} + \tau_{err}) - \psi_m)|_{k+1,t} \geq |V_{LC}(k,t) - \Delta V_{LC}(t) = LV(26)$$

k is the current program cycle.

t is the time (or position) within the cycle.

$V_{LC}(k,t)$ is the learned value of the lefthand term in 23a.

$\Delta V_{LC}(k,t)$ is the variation in $V_{LC}$ between different cycles.

The model-based limit according to 23a is suitably used when the learning starts or if $\Delta V_{LC}$ is too great.

To sum up, the alarm conditions 23a–23d are generally very useful and may be used, with minor modifications, for detection of runaway, incorrect load, jamming, frictional deviation, collision, measurement system errors, control electronics errors, drive system errors, configuration parameter errors, brake application, etc.

When the alarm conditions have detected an alarm situation, this can be used for changing control strategy, initiating emergency braking, etc. What is to be done is determined by a logic module, which checks the speeds, positions, torques, etc., of the axes.

The above embodiments show a servo with torque feedforward control, but the invention is also applicable to a servo which has no feedforward control. In such an embodiment, the output signals from the trajectory generator constitute reference signals to the servo ($\psi_{ref} = \psi_{bg}, \dot{\psi}_{ref} = \dot{\psi}_{bg}$).

Figure 7:
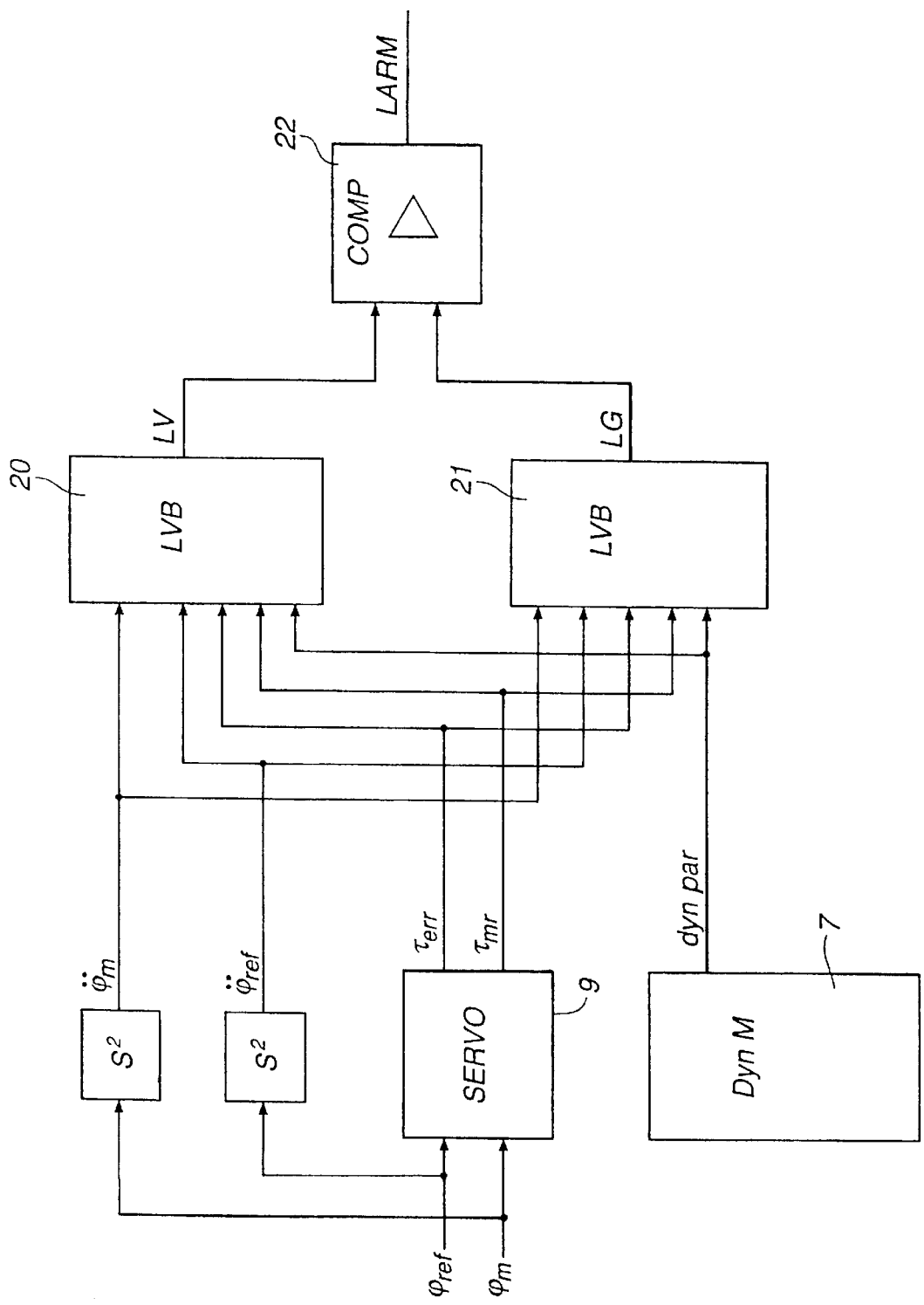
FIG. 7 shows a block diagram for supervision of the movement control of a manipulator according to the invention.

FIG. 7 shows a general block diagram for supervision of the movement control of a manipulator according to the invention. The dynamic model calculates a plurality of dynamic parameters, block 7, based on calculated reference values for the position of the robot axis. The reference value for the position $\psi_{ref}$ of the axis and the current position $\psi_m$ of the axis is supplied to the servo which calculates the motor torques $\tau_{mr}$ and $\tau_{err}$ which are torques dependent on control errors in the position and speed control, block 9. If the servo has no feedforward control, then $\tau_{mr} = \tau_{err}$. An alarm value LV is calculated, block 20, in dependence on the current acceleration $\ddot{\psi}_m$ of the axis, dynamic parameters and at least some of the signals $\psi_{ref}$ (alarm condition 23a), $\tau_{err}$ (alarm condition 23a), and $\tau_{mr}$ (alarm conditions 23b–23d). An alarm limit LG is calculated, block 21, in dependence on a combination of dynamic parameters and at least some of the signals $\psi_{ref}$ (alarm condition 23a), $\tau_{err}$ (alarm condition 23a), $\tau_{mr}$ (alarm condition 23b–23d) och $\ddot{\psi}_m$ (alarm condition 23d). The alarm value is compared with the alarm limit and an alarm signal ALARM is generated in dependence on the comparison.

What is claimed is:

1. A method for supervision of the movement control of a manipulator, the manipulator comprising a movable part which may be moved relative to a fixed part or another movable part, at least one movement axis (A1–A6) for positioning the movable part, a motor which drives the shaft and hence the movable part, a servo (9) for controlling the axis in accordance with supplied reference values for position, speed and acceleration ($\psi_{ref}, \dot\psi_{ref}, \ddot\psi_{ref}$), and a position sensor (10) adapted to supply an output signal which defines the current position ($\psi_m$) of the axis, wherein a plurality of dynamic parameters ($J^*_{tot}, J^*_{totMAX}, k^*_{Tdev}, \tau^*_{devm}, \tau^*_{distin}, \tau^*_{deva}$) are calculated in dependence on reference values for the position and speed of the axis and a dynamic model (7) which describes the static and dynamic properties of the robot, the current acceleration ($\ddot\psi_m$) of the axis is calculated on the basis of the current position ($\psi_m$) of the axis, a torque signal ($\tau_{mr}$) is generated by the servo in dependence on the control error torque ($\tau_{err}$) of the servo, characterized in that it further comprises the following steps:

an alarm value (LV) is calculated as a function of the current acceleration ($\ddot\psi_m$), at least some of the dynamic parameters ($J^*_a, J^*_m, c^*, k^*$) and one or more of the following signals: the control error torque ($\tau_{err}$) of the servo, the reference value for the acceleration ($\ddot\psi_{ref}$) and the torque signal from the servo ($\tau_{mr}$), and while using one or more signal filters ($G^*_1, G^*_2, G_2^{-1*}$), an alarm limit (LG) is calculated as a function of one or more of the following parameter: a constant, the current position ($\psi_m$), the current speed ($\dot\psi_m$), the current acceleration ($\ddot\psi_m$), any of the dynamic parameters ($J^*_{tot\,max}, J^*_{deva}, k^*_{dev}, \tau^*_{dist}, \tau^*_{dev}$), the control error torque ($\tau_{err}$) of the servo, the reference value for the acceleration ($\ddot\psi_{ref}$) and the torque signal from the servo ($\tau_{mr}$), the alarm value is compared with the alarm limit and an alarm signal (LARM) is generated in dependence on the comparison.

2. A method according to claim 1, characterized in that in the calculation of the alarm limit, estimations of maximum model errors ($\tau^*_{devm}, \tau^*_{deva}, k^*_{Tdev}, J^*_{deva}$) as well as one or more signal filters ($G^*_{1max}, G^*_{2max}$) are utilized.

3. A method according to claim 1, characterized in that said signal filter ($G^*_1$) is a model of the transfer function between supplied torque on the motor side and the acceleration of the motor axis.

4. A method according to claim 1, characterized in that signal filter ($G^*_2$) is a model of the transfer function between supplied torque on the arm side and the acceleration of the motor axis.

5. A method according to claim 1, characterized in that the alarm value (LV1) is calculated in dependence on the following relationship:

$$G^*_1 \cdot (J^*_{tot} \cdot \ddot\psi_{ref} + \tau_{err}) - \ddot\psi_m.$$

6. A method according to claim 1, characterized in that the alarm limit (LG1) is calculated in dependence on the following relationship:

$$|G_B \cdot (G^*_{1max} \cdot [k^*_{Tdev} \cdot J^*_{tot\,max} \cdot \ddot\psi_{ref} + \tau^*_{devm} - k^*_{Tdev} \cdot \tau^*_{distm} - (1+k^*_{Tdev}) \cdot \tau^*_{dista} + k^*_{Tdev} \tau_{err}] + G^*_{2max} \cdot [\tau^*_{dista} + \tau^*_{deva}])|.$$

7. A method according to claim 1, characterized in that the alarm limit (LG2) is calculated in dependence on the following relationship:

$$|G_B \cdot (G^*_{1max} \cdot [k^*_{Tdev} \cdot J^*_{totmax} \cdot \ddot\psi_{ref} + \tau^*_{devm} - k^*_{tdev} \cdot \tau_{err}] + \mathrm{Max}\{G^*_{1max} \cdot \tau^*_{deva}, G^*_{2max} \cdot \tau^*_{deva}\})|.$$

8. A method according to claim 1, characterized in that the alarm value (LV3) is calculated in dependence on the following relationship:

$$|G_A \cdot (G_2^{-1} \cdot G^*_1 \cdot (\tau_{mr} + \tau^*_{distm}) + \tau^*_{dista} - G_2^{-1} \cdot \ddot\psi_m)|.$$

9. A method according to claim 1, characterized in that the alarm value (LG4) is calculated in dependence on the following relationship:

$$|G_B \cdot (G_{2max}^{-1} \cdot G^*_{1max} \cdot (k^*_{Tdev} \cdot \tau_{mr} + \tau^*_{devm}) + \tau^*_{deva})|.$$

10. A method according to claim 1, characterized in that the alarm value (LG3) is calculated in dependence on the following relationship:

$$|G_B \cdot (G^*_{1max} \cdot (k^*_{Tdev} \cdot \tau_{mr} + \tau^*_{devm}) + G^*_{2max} \tau^*_{deva})|.$$

11. A method according to claim 1, characterized in that the alarm value (LV2) is calculated in dependence on the following relationship:

$$|G_A \cdot (G^*_1 \cdot (\tau_{mr} + \tau^*_{distm}) + G^*_2 \cdot \tau^*_{dista} - \ddot\psi_m)|.$$

12. A method according to claim 1, characterized in that the alarm value (LV4) is calculated in dependence on the following relationship:

$$|G_A \cdot (G_2^{-1*} \cdot G^*_1 \cdot (\tau_{mr} - J^*_m \cdot \ddot\psi_m + \tau^*_{distm}) + \tau^*_{dista} - J^*_a \cdot \ddot\psi_m)|.$$

13. A method according to claim 1, characterized in that the alarm limit (LG5) is calculated in dependence on the following relationship:

$$|G_B \cdot (G_{2max}^{-1} \cdot G^*_{1max} \cdot (k^*_{Tdev} \cdot \tau_{mr} - J^*_{devm} \cdot \ddot\psi_m + \tau^*_{devm}) + \tau^*_{deva} + J^*_{deva} \cdot \ddot\psi_m)|.$$

14. A method according to claim 1, characterized in that the alarm value (LV5) is calculated in dependence on the following relationship:

$$|G_A \cdot (G^*_1 \cdot (J^*_{tot} \cdot \ddot\psi_{ref} + \tau_{err}) - \ddot\psi_m)|_{k+1, t}.$$

15. A method according to claim 1, characterized in that the alarm limit (LG6) is calculated in dependence on the following relationship:

$$|V_{LC}(k,t) \pm \Delta V_{LC}|.$$

* * * * *